United States Patent
Meyer

[11] Patent Number: 6,074,144
[45] Date of Patent: Jun. 13, 2000

[54] FASTENER WITH RETAINED MOVABLE PIN

[75] Inventor: Charles Meyer, New Lenox, Ill.

[73] Assignee: Illinois Tool Works Inc., Glenview, Ill.

[21] Appl. No.: 09/231,011

[22] Filed: Jan. 14, 1999

[51] Int. Cl.[7] .................................................. F16B 13/04
[52] U.S. Cl. .................................................. 411/41; 411/45
[58] Field of Search .................................. 411/41, 45–48, 411/80.1, 80.2, 80.5

[56] References Cited

U.S. PATENT DOCUMENTS

| | | | |
|---|---|---|---|
| 2,941,439 | 6/1960 | Rapata | 411/41 |
| 3,918,130 | 11/1975 | Poe | 411/41 |
| 4,312,614 | 1/1982 | Palmer et al. | |
| 4,571,134 | 2/1986 | Beglinger | 411/41 |
| 4,674,930 | 6/1987 | Poe | 411/41 |
| 4,821,391 | 4/1989 | Kaneko et al. | |
| 4,927,287 | 5/1990 | Ohkawa et al. | |
| 5,163,795 | 11/1992 | Bonoit | 411/41 |
| 5,301,396 | 4/1994 | Benoit | |
| 5,319,839 | 6/1994 | Shimajiri | |
| 5,568,675 | 10/1996 | Asami et al. | |
| 5,592,719 | 1/1997 | Eto et al. | |
| 5,689,863 | 11/1997 | Sinozaki | |
| 5,704,753 | 1/1998 | Ueno | |
| 5,758,987 | 6/1998 | Frame et al. | |
| 5,775,860 | 7/1998 | Meyer | 411/41 |

*Primary Examiner*—Flemming Saether
*Attorney, Agent, or Firm*—Pitney, Hardin, Kipp and Szuch LLP

[57] ABSTRACT

The fastener includes a body and a locking pin. The body includes a base with an aperture therethrough which is aligned with a slot formed between two downwardly extending conjoined arms. The downwardly extending conjoined arms include predrive engagement notches and locking surfaces. The locking pin includes two downwardly extending flexible legs with predrive positioning protrusions. In the predriven position of the fastener, the predrive positioning protrusions are engaged by the predrive engagement notches. In the driven position of the fastener, the predrive positioning protrusions are engaged by the locking surfaces. Additionally, in the driven position, pin retention protrusions on the locking pin are engaged by mating surfaces in the base of the body. The predrive positioning protrusions are formed in a plane which is perpendicular to the plane in which the pin retention protrusions are formed.

12 Claims, 2 Drawing Sheets

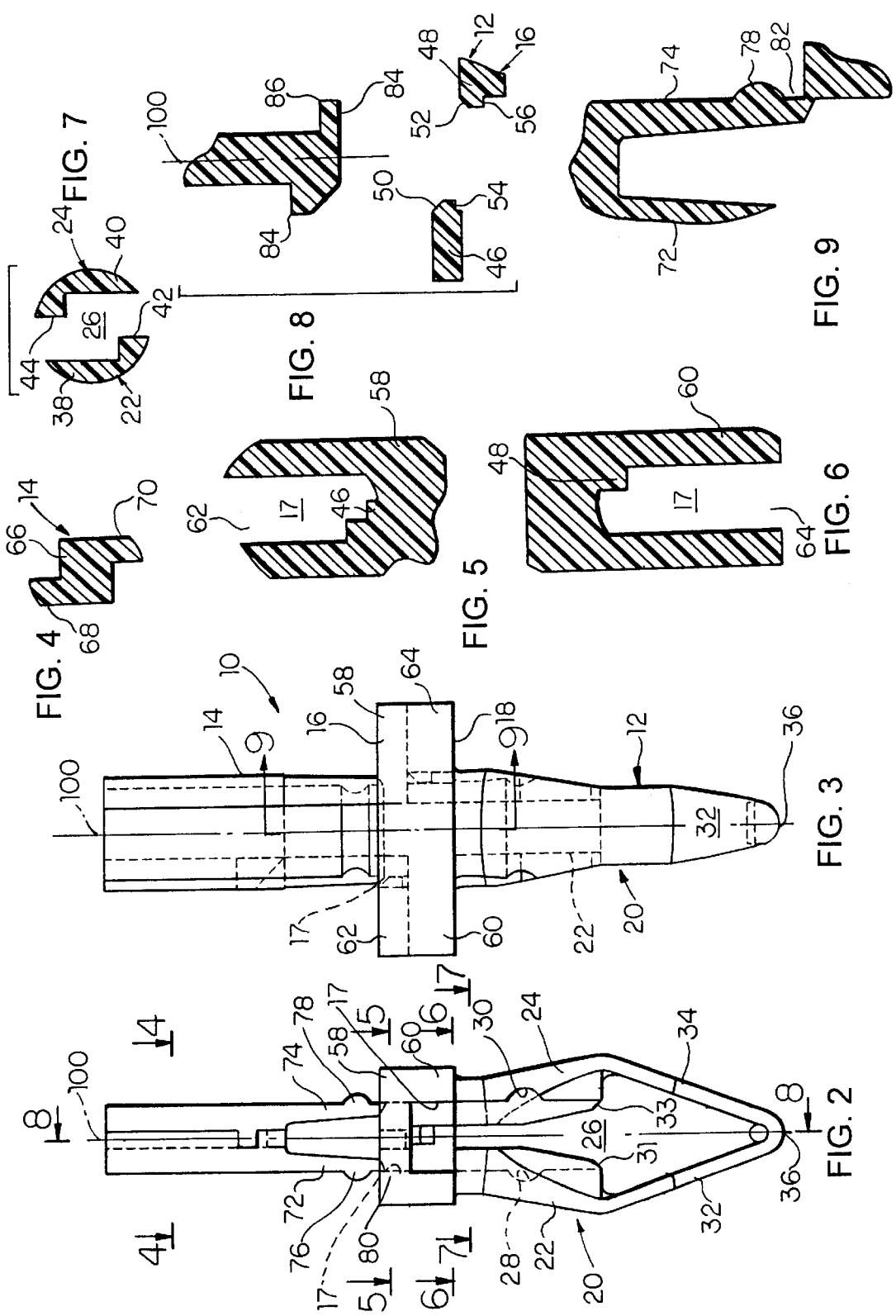

FASTENER WITH RETAINED MOVABLE PIN

BACKGROUND OF THE INVENTION

1. Field of the Invention

The present invention pertains to a fastener with pin retention protrusions independent of the predrive positioning protrusions. The pin retention protrusions are formed on a plane which is perpendicular to the plane upon which the predrive positioning protrusions are formed.

2. Description of the Prior Art

In the prior art, fasteners, such as those for joining adjacent panels of sheet metal through aligned apertures, have typically located positioning protrusions in the body of the fastener. As the pin is driven, the body must flex outwardly against the constraining aperture. This configuration can result in high pin insertion forces. However, low pin insertion forces, such as less than ten pounds, are advantageous for ergonomic reasons. While insertion forces can be reduced by reducing the size of the positioning protrusions, this can result in pin dislocation from the predriven position during shipping which is not acceptable.

Fasteners in the prior art which require a twisting motion during installation are ergonomically unsound. Similarly, threaded fasteners require expensive and hazardous installation tools.

OBJECTS AND SUMMARY OF THE INVENTION

It is therefore an object of this invention to provide a fastener with low pin insertion forces required for installation.

It is therefore a further object of this invention to provide a fastener with high retention forces subsequent to installation.

It is therefore a still further object of this invention to provide a fastener with high integrity in the predriven state.

It is therefore a still further object of this invention to provide a fastener which reduces or eliminates any twisting motions required for installation.

It is therefore a still further object of this invention to provide a fastener which reduces or eliminates any threaded components.

It is therefore a final object of this invention to provide a fastener which has low manufacturing costs.

These and other objects are attained by a fastener which includes a double tapered slotted body and a locking pin with flexible legs at the tip thereof. Two predrive positioning protrusions on the flexible legs engage notches in the lower body in the predriven state. The fastener is installed by inserting the lower body into an appropriate sized hole, and locking pin is pushed to its fully seated position locking the fastener to the panel.

The double tapered slotted body has a closed tapered nose for easy insertion into the aperture. At the widest point, the diameter of the body exceeds the diameter of the aperture. The slot allows the body to deflect inwardly for insertion. Once the body is installed the pin is fully driven, filling the slot and preventing the collapse necessary to remove the body.

At the upper end of the body, typically just above the mounting surface, notches are configured to receive the pin retention protrusions of the pin. The notches are ramped to ease insertion and have a square or back angled upper surface to prevent the pin from being removed from the body. The predrive positioning protrusions on the flex legs have a similar configuration. The predrive positioning protrusions are set back from the tip of the pin so that a portion of the flex leg protrudes into the body. This stabilizes the pin in the predriven position to prevent accidental dislocation. The flex legs deflect inwardly as the pin is driven. In the driven position, the predrive positioning protrusions engage locking surfaces at the bottom of the slot.

The pin retention protrusions are located on a first plane which passes through the longitudinal axis of the fastener. The predrive positioning protrusions are located on a second plane which passes through the longitudinal axis of the fastener. The first and second planes are perpendicular to each other. Due to the limited flex in the first plane, increased effort is required to predrive the pin past the retention protrusions, but this limited flex also provides high retention forces once the pin is predriven. As the predrive operation is mechanized, the insertion effort to the predriven position is of little concern. Once predriven, the pin held by the predrive positioning protrusions on the flex arms (in the second plane) at the tip of the pin and corresponding notches in the fastener body. A nominal effort is then required by the assembler to drive the pin fully, securing the fastener.

BRIEF DESCRIPTION OF THE DRAWINGS

Further objects and advantages of the invention will become apparent from the following description and claims, and from the accompanying drawings, wherein:

FIG. 2 is a front plan view of the fastener of the present invention.

FIG. 3 is a side plan view of the fastener of the present invention.

FIG. 4 is a cross-sectional view along plane 4—4 of FIG. 2.

FIG. 5 is a cross-sectional view along plane 5—5 of FIG. 2.

FIG. 6 is a cross-sectional view along plane 6—6 of FIG. 2.

FIG. 7 is a cross-sectional view along plane 7—7 of FIG. 2.

FIG. 8 is a cross-sectional view along plane 8—8 of FIG. 2.

FIG. 9 is a cross-sectional view along plane 9—9 of FIG. 3.

DETAILED DESCRIPTION OF THE PREFERRED EMBODIMENT

Figure 1:
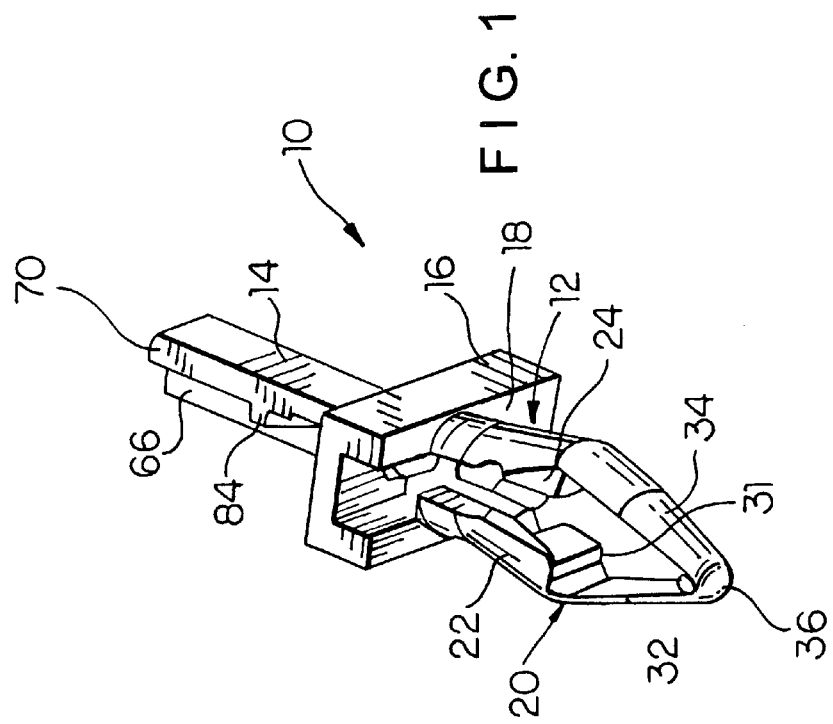
FIG. 1 is a perspective view of the fastener of the present invention.

Referring now to the drawings in detail wherein like numerals refer to like elements throughout the several views, one sees that FIG. 1 is a perspective view of fastener 10 of the present invention, including double tapered body 12 into which locking pin 14 is inserted. As shown in FIGS. 2 and 3, double tapered body 12 includes generally rectangular base 16 with a bottom surface 18 which abuts the panels (not shown) to be joined, and aperture 17 through which locking pin 14 is inserted. Double tapered nose 20 extends downwardly from bottom surface 18 and is configured to be inserted through the aligned openings of the panels (not shown) to be joined.

As shown in FIG. 2, double tapered nose 20 is formed from two downwardly extending arms 22, 24 with slot 26 formed therebetween through which locking pin 14 traverses between the predriven and driven states. Slot 26 is aligned with aperture 17. The outer surfaces of downwardly extending arms 22, 24 join base 16 at a distance equal to the diameter of the opening to be engaged by fastener 10. Downwardly extending arms 22, 24 splay outwardly slightly so that the outer surfaces at the lower ends thereof are separated by a distance greater than the diameter of the opening to be engaged by fastener 10. However, in the predriven state when locking pin 14 is not fully driven between downwardly extending arms 22, 24, the lower portions of downwardly extending arms 22, 24 can flex inwardly toward each other to pass through such an aperture. Notches 28, 30 are formed on the interior surfaces of downwardly extending arms 22, 24, respectively, facing slot 26. Locking surfaces 31, 33 are formed at the bottom of slot 26 on the lower ends of downwardly extending arms 22, 24. Conjoining arms 32, 34 extend inwardly and downwardly from lower ends of downwardly extending arms 22, 24, respectively, and join together to form tip 36.

As shown in FIG. 7, the cross sections of downwardly extending arms 22, 24 include oppositely facing portions 38, 40, respectively, of partially circular cross section which define slot 26. Additionally, downwardly extending arms 22, 24 include diagonally opposed lateral sections 42, 44 to engage the cross section of locking pin 14 as shown in FIG. 4 and to prevent lateral movement or twisting of locking pin 14 within slot 26.

As shown in FIG. 8, the interior of generally rectangular base 16 includes mating surfaces 46, 48. Mating surfaces 46, 48 include upper chamfered sections 50, 52, respectively, for passing pin retention protrusions 84, 86 of locking pin 14 as locking pin 14 moves from the predriven to the driven positions as will be explained in detail hereinafter. Mating surfaces further include lower detent surfaces 54, 56, respectively, for engaging pin retention protrusions 84, 86 of locking pin 14 in the predrive state and resisting the subsequent withdrawal of locking pin 14.

Mating surface 46 is formed on upper portion 58 of generally rectangular base 20 (see FIG. 5), and mating surface 48 is formed on lower portion 60 of generally rectangular base 20 (see FIG. 6). As shown in FIG. 5, mating surface 46 is laterally opposed from open section 62 of upper portion 58 of generally rectangular base 20. Similarly, as shown in FIG. 6, mating surface 48 is laterally opposed from open section 64 of lower portion 60.

As shown in FIG. 2, locking pin 14 traverses through aperture 17 into slot 26. As shown in FIG. 4, locking pin 14 has a shaft 66 of generally rectangular cross section with alignment wings 68, 70 which travel with the gap formed between oppositely facing portion 38 and diagonally opposed lateral section 44 (see FIG. 7) and the gap formed between oppositely facing portion 40 and diagonally opposed lateral section 42, respectively.

As further shown in FIG. 2, locking pin 14 includes an upper portion of the cross section shown in FIG. 4 and a lower portion comprising two downwardly extending parallel flexible legs 72, 74. Flexible legs 72, 74 include outwardly extending predrive positioning protrusions 76, 78, respectively. Fastener 10 is preferably initially molded as a single plastic piece with integral interstices 80, 82 formed at the junction of double tapered body 12 and flexible legs 72, 74 of locking pin 14. However, fastener 10 is preferably shipped in the predriven position wherein interstices 80, 82 are broken and locking pin 14 is inserted into double tapered body 12 so that predrive positioning protrusions 76, 78 align with notches 28, 30 on the interior surfaces of downwardly extending arms 22, 24, and are engaged therein by the outward flexure of flexible legs 72, 74.

As shown on FIG. 8, locking pin 14 further includes pin retention protrusions 84, 86 which are formed in a plane perpendicular to the plane in which predrive positioning protrusions 76, 78 are formed, both planes passing through longitudinal axis 100 of fastener 10. That is, the intersection of the two planes corresponds to the longitudinal axis 100 of fastener 10.

When locking pin 14 is forced downwardly from the predriven position, predrive positioning protrusions 76, 78 are disengaged from notches 28, 30 and are engaged by locking surfaces 31, 33 at the bottom of slot 26. In this locked position, flexible legs 72, 74 are flexed inwardly so as to abut each other thereby forcing downwardly extending arms 22, 24 apart to a relatively inflexible locked position. This configuration inhibits any movement of downwardly extending arms 22, 24 toward each other so that the lower ends thereof maintain the splayed relationship which results in a distance greater than that of the opening (not shown) through which fastener 10 passes thereby providing the fastening function. The resulting position is the driven state or the installed state.

To use fastener 10, the installer typically either receives fastener 10 in the predriven state or predrives fastener 10 by inserting locking pin 14 into double tapered base 12 so that interstices 80, 82 break and predrive positioning protrusions 76, 78 are engaged by notches 28, 30. The installer then pushes tip 36 of fastener 10 through the opening of the panels (not shown) to be fastened and urges fastener 10 until bottom surface 18 of generally rectangular base 16 of double tapered body 12 is flush with one of the panels. This insertion will typically cause downwardly extending arms 22, 24 to move toward each other momentarily as the widest portion therebetween passes through the opening. The user then forces locking pin 18 downwardly causing predrive positioning protrusions 76, 78 to become disengaged from notches 28, 30 and subsequently engaged by locking surfaces 31, 33, respectively, at the bottom of slot 26. This results in the driven state of fastener 10.

Figure 10:
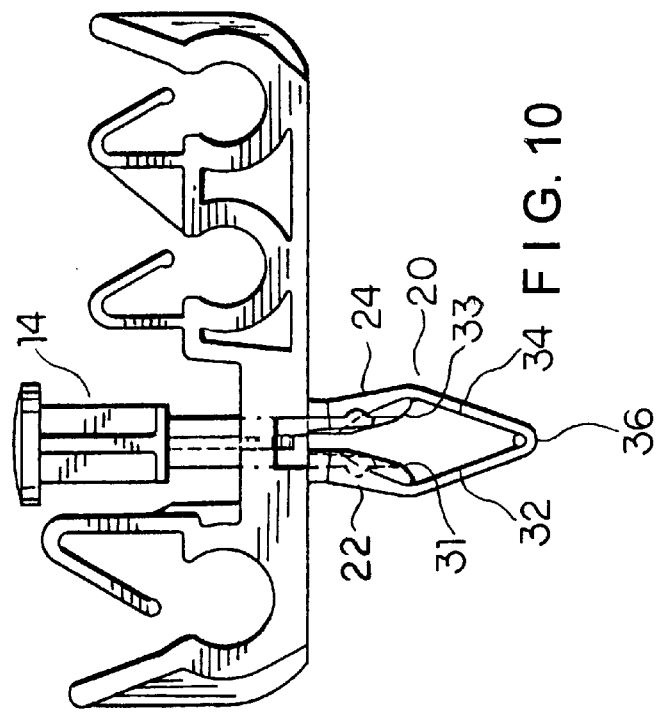
FIG. 10 is a plan view of a second embodiment of the invention, wherein a routing clip is incorporated into the structure.

The device has many applications. In addition to being used as a fastener as described above, it can be used in routing clips (see FIG. 10), brackets, hole plugs, and decorative or functional covers. The high retention force makes the device an ideal replacement for threaded covers.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A fastener comprising:
   a body including a base and conjoined arms extending downwardly from said base, said base further including an aperture aligned with a slot formed between said conjoined arms, said aperture including mating surfaces, and said conjoined arms including predrive positioning notches and locking surfaces;
   a locking pin traveling within said aperture and said slot, and having a predriven position and a driven position therein, said locking pin further including a longitudinal axis;

said locking pin including lateral extending predrive positioning protrusions which engage said predrive positioning notches to releasably retain said locking pin in said predriven position and engage said locking surfaces to releasably retain said locking pin in said driven position, said locking pin further including pin retention protrusions which engage said mating surfaces in said predriven position to retain said locking pin within said aperture and said slot; and wherein said predrive positioning protrusions are formed on a first plane and said pin retention protrusions are formed on a second plane, said first plane and said second plane being perpendicular to each other and an intersection of said first plane and said second plane corresponding to said longitudinal axis.

2. The fastener of claim 1 wherein said conjoined arms comprise downwardly extending outwardly splayed portions defining said slot therebetween, and inwardly extending portions which meet to form a tip.

3. The fastener of claim 2 wherein said predrive positioning notches are formed on an interior central portion of said downwardly extending outwardly splayed portions.

4. The fastener of claim 3 wherein said locking surfaces are formed at a relatively lower portion of said downwardly extending outwardly splayed portions.

5. The fastener of claim 4 wherein at joinder of said base and said conjoined arms, outer surfaces of said downwardly extending outwardly splayed portions are separated by a distance equal to that of a diameter of an opening to which said fastener is adapted to be engaged, and wherein at joinder of said downwardly extending outwardly splayed portions and said inwardly extending portions, outer surfaces of said downwardly extending outwardly splayed portions are separated by a distance greater than that of a diameter of said opening.

6. The fastener of claim 5 wherein in said predriven state, said downwardly extending outwardly splayed portions can be flexed inwardly and in said driven state, said locking pin inhibits said downwardly extending outwardly splayed portions from being flexed inwardly.

7. The fastener of claim 6 wherein said locking pin includes downwardly extending flexible legs upon which said predrive positioning protrusions are formed.

8. The fastener of claim 7 wherein in said predriven state, said downwardly extending flexible legs maintain a space therebetween thereby allowing flexure of said downwardly extending flexible legs toward each other.

9. The fastener of claim 8 wherein in said driven state, at least a portion of said downwardly extending flexible legs abut each other thereby inhibiting further flexure of said downwardly extending flexible legs toward each other.

10. The fastener of claim 9 wherein said downwardly extending outwardly splayed portions include diagonally opposed lateral sections and said locking pin includes alignment wings, said alignment wings engaging a gap formed between one of said downwardly extending splayed portions and another of said diagonally opposed lateral sections.

11. The fastener of claim 10 wherein said mating surfaces are formed on different levels within said base.

12. The fastener of claim 11 wherein said body and said locking pin are initially formed as a single piece of molded plastic with interstices formed therebetween.

* * * * *